(12) United States Patent
Poldervaart et al.

(10) Patent No.: US 7,484,470 B2
(45) Date of Patent: Feb. 3, 2009

(54) SOFT QUAY MOORING SYSTEM

(75) Inventors: Leendert Poldervaart, Monaco (MC); Hein Oomen, Nice (FR); Jack Pollack, Monte-Carlo (MC)

(73) Assignee: Single Buoy Moorings Inc., Marly (CH)

( * ) Notice: Subject to any disclaimer, the term of this patent is extended or adjusted under 35 U.S.C. 154(b) by 0 days.

(21) Appl. No.: 11/667,352

(22) PCT Filed: Nov. 10, 2005

(86) PCT No.: PCT/NL2005/050035

§ 371 (c)(1),
(2), (4) Date: May 9, 2007

(87) PCT Pub. No.: WO2006/065130

PCT Pub. Date: Jun. 22, 2006

(65) Prior Publication Data

US 2008/0006196 A1  Jan. 10, 2008

(30) Foreign Application Priority Data

Nov. 11, 2004 (EP) .................................. 04078102
May 18, 2005 (EP) .................................. 05104218

(51) Int. Cl.
*B63B 21/00* (2006.01)
(52) U.S. Cl. .................................. 114/230.13
(58) Field of Classification Search ............. 114/230.13
See application file for complete search history.

(56) References Cited

U.S. PATENT DOCUMENTS 4,480,576 A   11/1984 Mills et al.
4,817,552 A    4/1989 Poldervaart et al.
7,299,760 B2 * 11/2007 Boatman et al. ........ 114/230.12

FOREIGN PATENT DOCUMENTS

| EP | 0 253 925 | 1/1988 |
|----|-----------|--------|
| GB | 1 312 863 | 4/1973 |
| GB | 2 319 010 | 5/1998 |

* cited by examiner

*Primary Examiner*—Jesus D Sotelo
(74) *Attorney, Agent, or Firm*—Young & Thompson

(57) ABSTRACT

The invention relates to a mooring system comprising a hydrocarbon storage and/or processing unit (1) anchored to or resting on the sea bed (2) at an offshore location, and a vessel (13) moored alongside the storage and/or processing unit (1), the storage and/or processing unit (1) comprising a hull and in a front part (26) and in a rear part (25) of the unit at least one support structure (7, 7') and with another end to a quay member (10, 10') suspended from the suspension member with one end attached to the support structure (7, 7') and with another end to a quay member (10, 10') suspended from the suspension member, the quay member (10, 10') comprising a shock-absorber contacting the vessel. The quay member comprising a mooring line attachment point, a cable extending from a mooring point on the front part of the vessel and on the rear part of the vessel respectively to a corresponding mooring line attachment point on the quay member, the mooring points on the vessel and the corresponding mooring line attachment points being spaced apart in a length direction of the vessel by a distance (L1, L2) of at least 5 m, preferably at least 10 m.

20 Claims, 9 Drawing Sheets

SOFT QUAY MOORING SYSTEM

Figure 1:
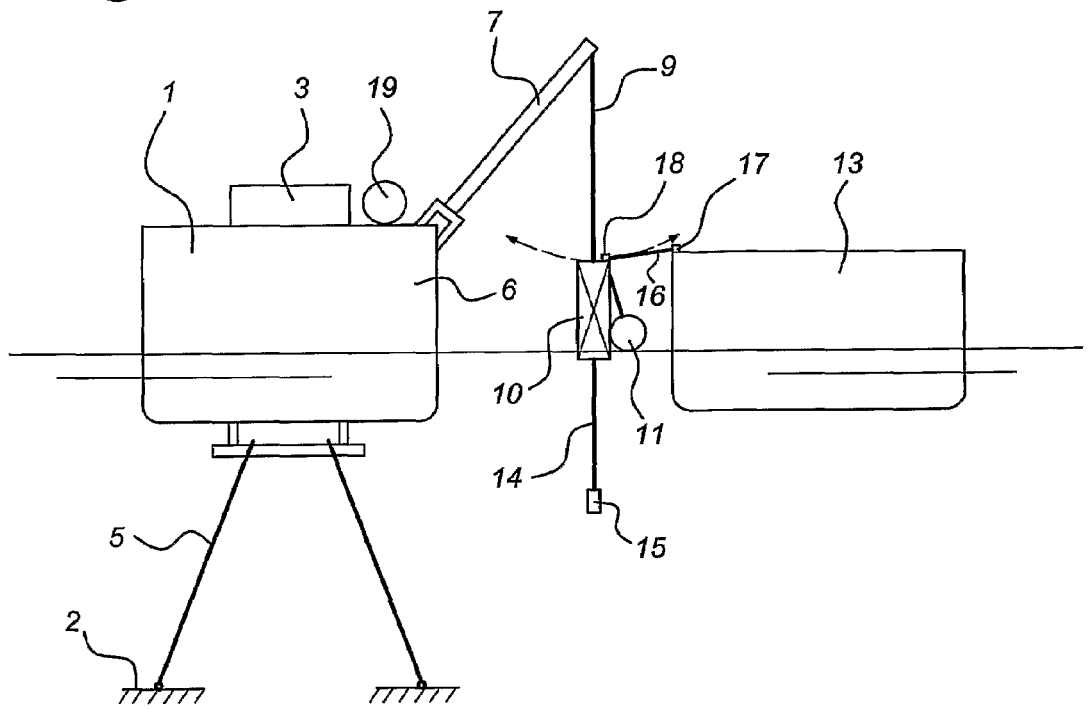

The invention relates to a side-by-side mooring system comprising a hydrocarbon storage and/or processing unit at a fixed offshore location and a vessel moored alongside the processing unit, the processing unit comprising a hull and in a front part and in a rear part of the unit a support structure along a side of the unit, projecting outboard from the hull, at least one suspension member with one end attached to the support structure and with another end to a quay member suspended from the suspension member, the quay comprising a shock-absorber contacting the vessel.

From U.S. Pat. No. 4,817,552 a mooring system is known in which a vessel is moored along a quay, pier or ship via weight-loaded fenders that are suspended from arms on the floating quay or vessel. The vessel is attached to the fenders via a cable extending substantially perpendicular to the tanker. The weight-loaded fenders provide a flexible mooring system which results in a sideways restoring force on the vessel upon mooring without forces on the fenders becoming prohibitively large. A disadvantage of the known system is that when used in an offshore environment, the mooring of the vessel to the floating quay or vessel will not be sufficiently rigid in a length direction to maintain proper alignment under prevailing sea states. Especially during transfer of cryogenic hydrocarbons, such as LNG, a sufficient mooring stability in the length direction of the vessel is required to allow uninterrupted and safe transfer of cryogenic fluids from the vessel to the storage and/or processing vessel.

In GB 1 312 863 a mooring system is disclosed for side-by-side mooring of a tanker to a storage vessel which accommodates the relative movements of the vessels in a rough sea. The vessels are moored one to the other via breast and spring anchor lines, and resilient buffers in the form of inflated tyres attached to outwardly projecting hydraulically damped arms. Hereby reliable offloading of oil from the tanker to a storage vessel may take place. The vessels are in close proximity, such that in case a hazardous situation arises on one vessel this may endanger the adjacent vessel. Due to the vessels proximity, sudden sway or yaw movements may result in large forces acting on the fenders. Furthermore, the articulated arm construction is relatively complex and will be subject to intensive maintenance when used in a harsh offshore environment.

It is an object of the present invention to provide a mooring system which allows flexible side-by side mooring.

It is another object to provide a side by side mooring system which allows a vessel to be moored to a unit at a relatively large separation and which allows a relatively large restoring force being exerted when the vessel approaches the unit.

It is again an object of the invention to provide a mooring system which allows fine tuning of the mooring system stiffness to environmental conditions, which is relatively simple and requires little maintenance.

It is a further object of the invention to provide a mooring system which can form a working platform situated between the vessels.

Hereto a mooring system according to the present invention is characterised by the quay member comprising a mooring line attachment point, a cable extending from a mooring point on the front part of the vessel and on the rear part of the vessel respectively to a corresponding mooring line attachment point on the quay member, the mooring points on the vessel and the corresponding mooring line attachment points being spaced apart in a length direction of the vessels by a distance of at least 5 m, preferably at least 10 m.

By mooring the vessel directly to the quay member in mooring positions that are situated at a longitudinal distance from the mooring positions on the quay member, the vessel is firmly attached to the quay member by breast and/or spring mooring lines in a length direction, at a relatively large separation from the processing and/or storage vessel, while having a relatively large degree of sideways (transverse) flexibility. The quay member itself can swing from the suspensions means and determines the longitudinal and transverse flexibility. Preferably the suspension means are steel wire cables or chains. Alternatively, pivoting rods, pivoting rigid constructions or combinations are possible as well. The breast and/or spring mooring lines can be steel wire cable, polyester or nylon cables, depending on the length and mooring forces to be taken, as long as a relative stiff connection between the quay member and the vessel is established.

In one embodiment of a side-by-side mooring system according to the present invention, the support structure is comprised of at least one member in the front and at least one member in the rear part of the unit, which can move independently, resulting in a reduced torque on the quay members.

In an preferred configuration, the quay member can be formed by a single structure in the form of a space frame which can be provided with buoyancy, ballast tanks and/or with additional weights, providing a continuous support of the vessel along a major part of its length and providing a work space or access platform between the vessel and the unit. The quay member can be used as a support for rigid or flexible fluid transfer systems between the unit and the vessel.

In another preferred embodiment the vessel is, in addition to the mooring lines that are connected to the quay, also directly attached to the storage and/or processing unit via multiple mooring lines, at the bow and the stem of the vessel. With these multiple mooring lines, which are preferably relatively flexible polyester or nylon lines, a transverse pre-tension in the direction of the storage and/or processing unit can be achieved. Depending on the mooring forces and sea-states to be handled these mooring lines can be attached to a constant tension device, such as a winch or hydraulic tensioner system, on the unit.

Figure 2:
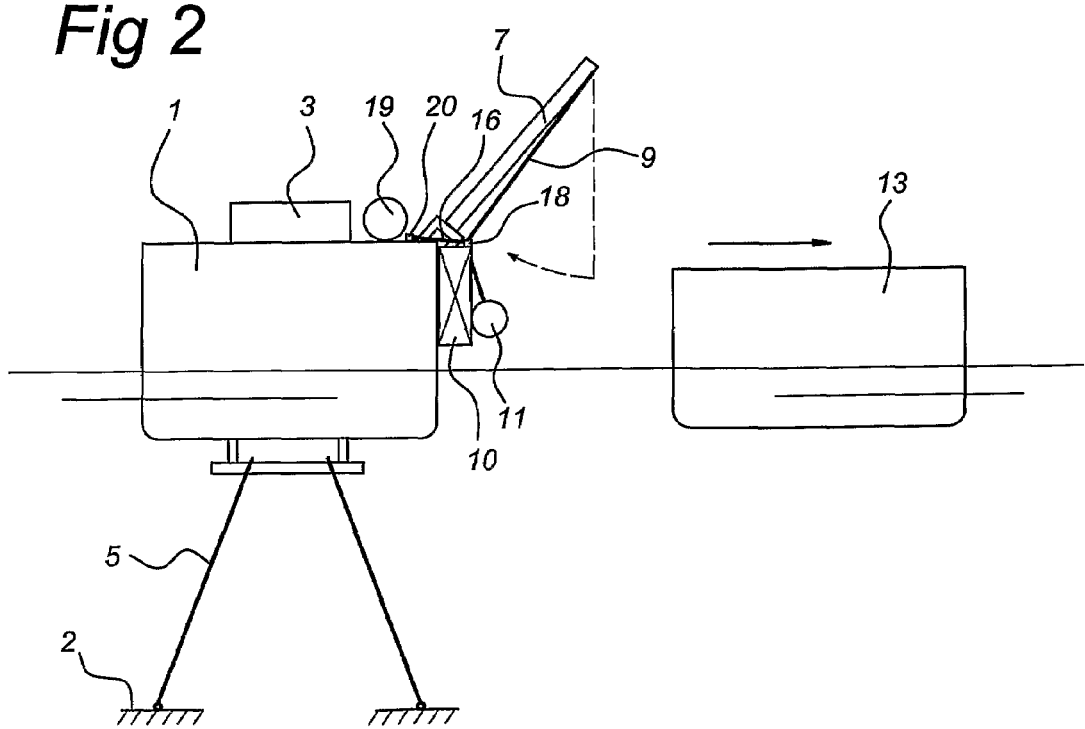
Figure 3:
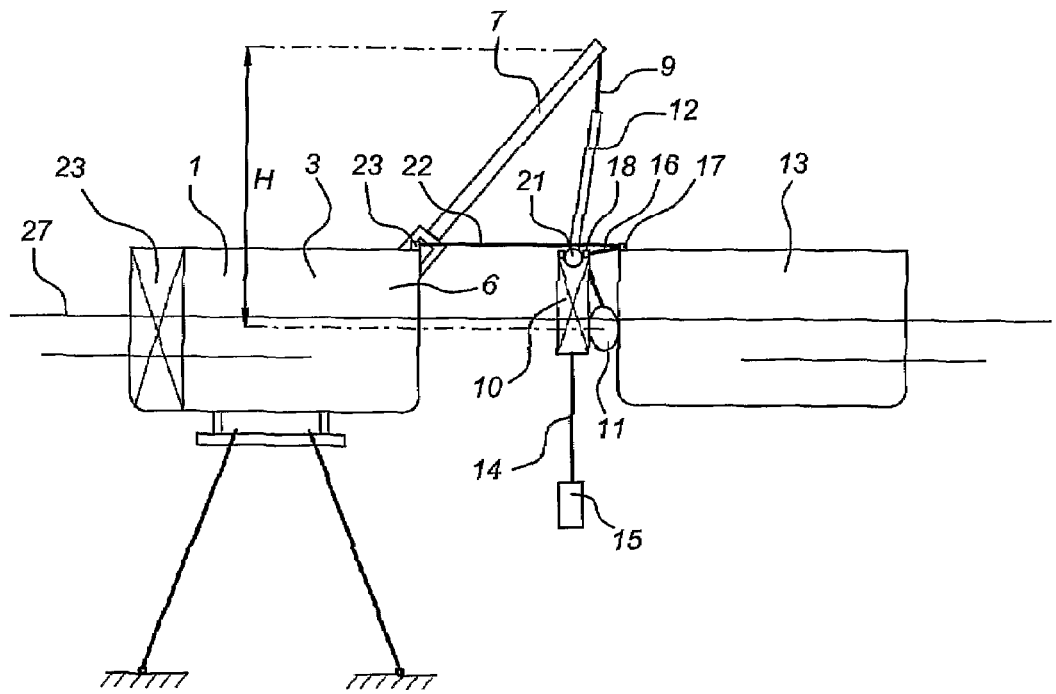
Figure 4:
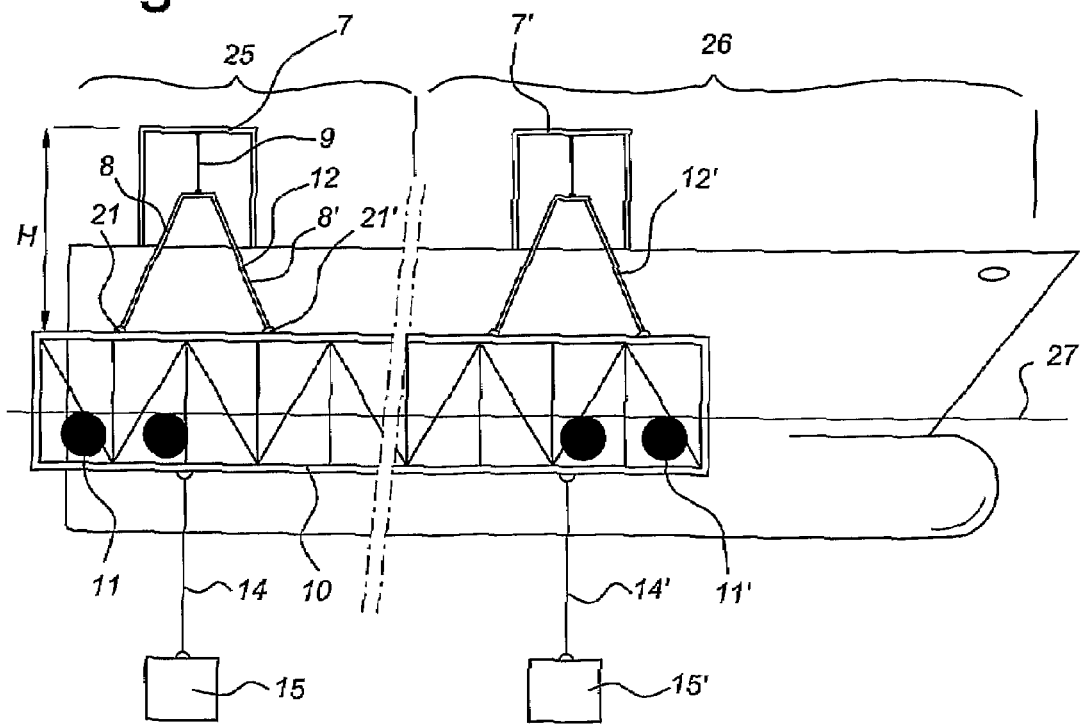
Figure 5:
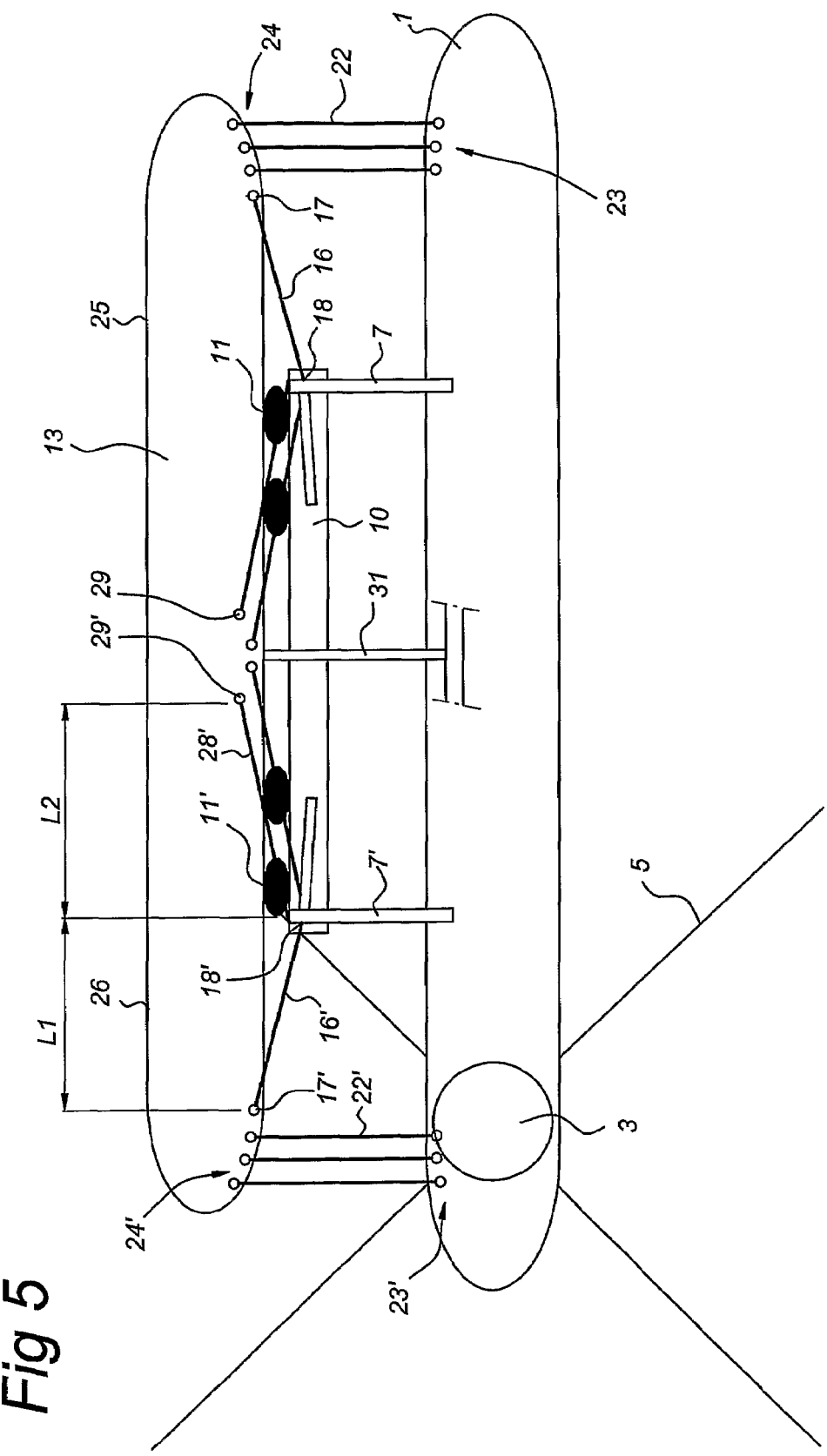
Figure 6:
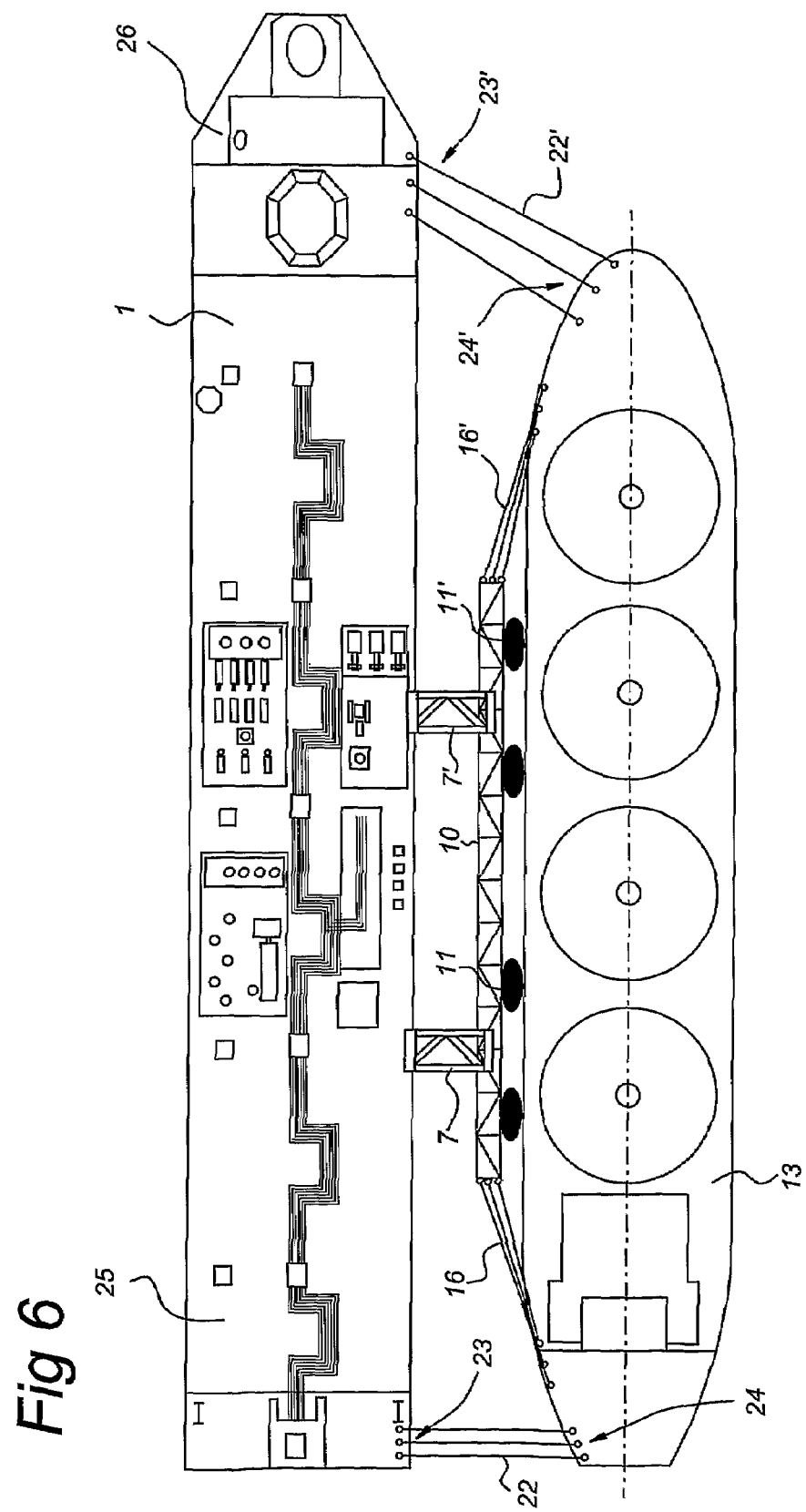
Figure 7:
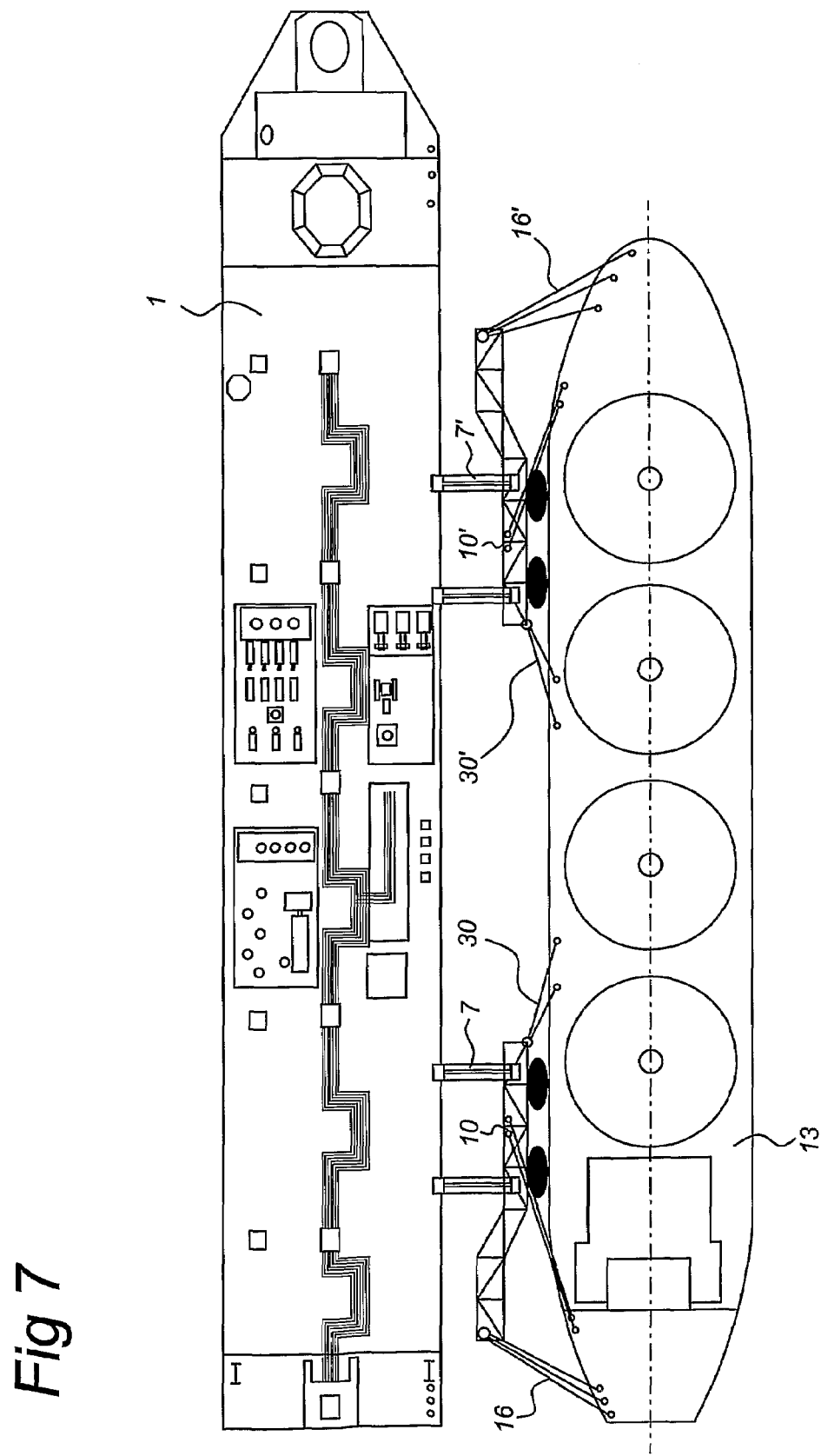
Figure 8:
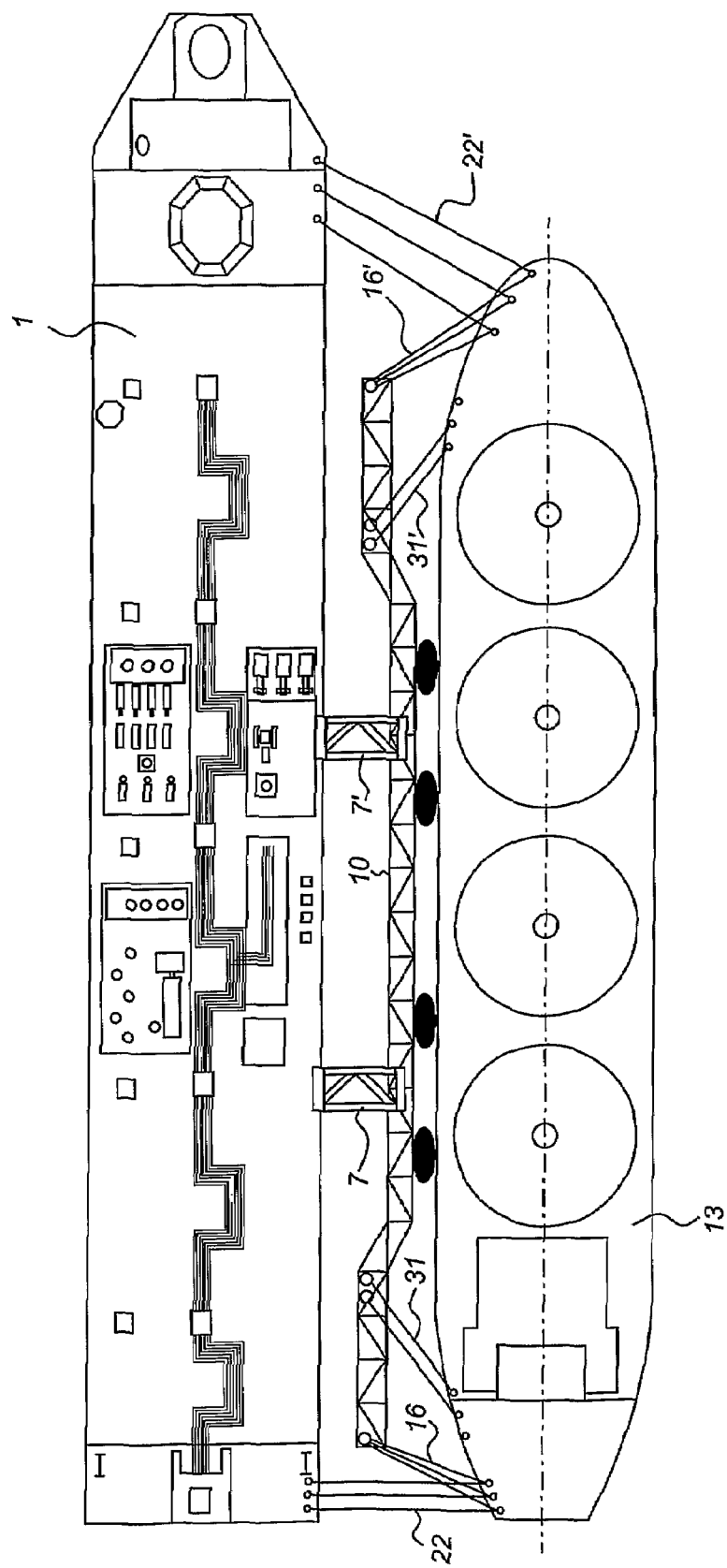
Figure 9:
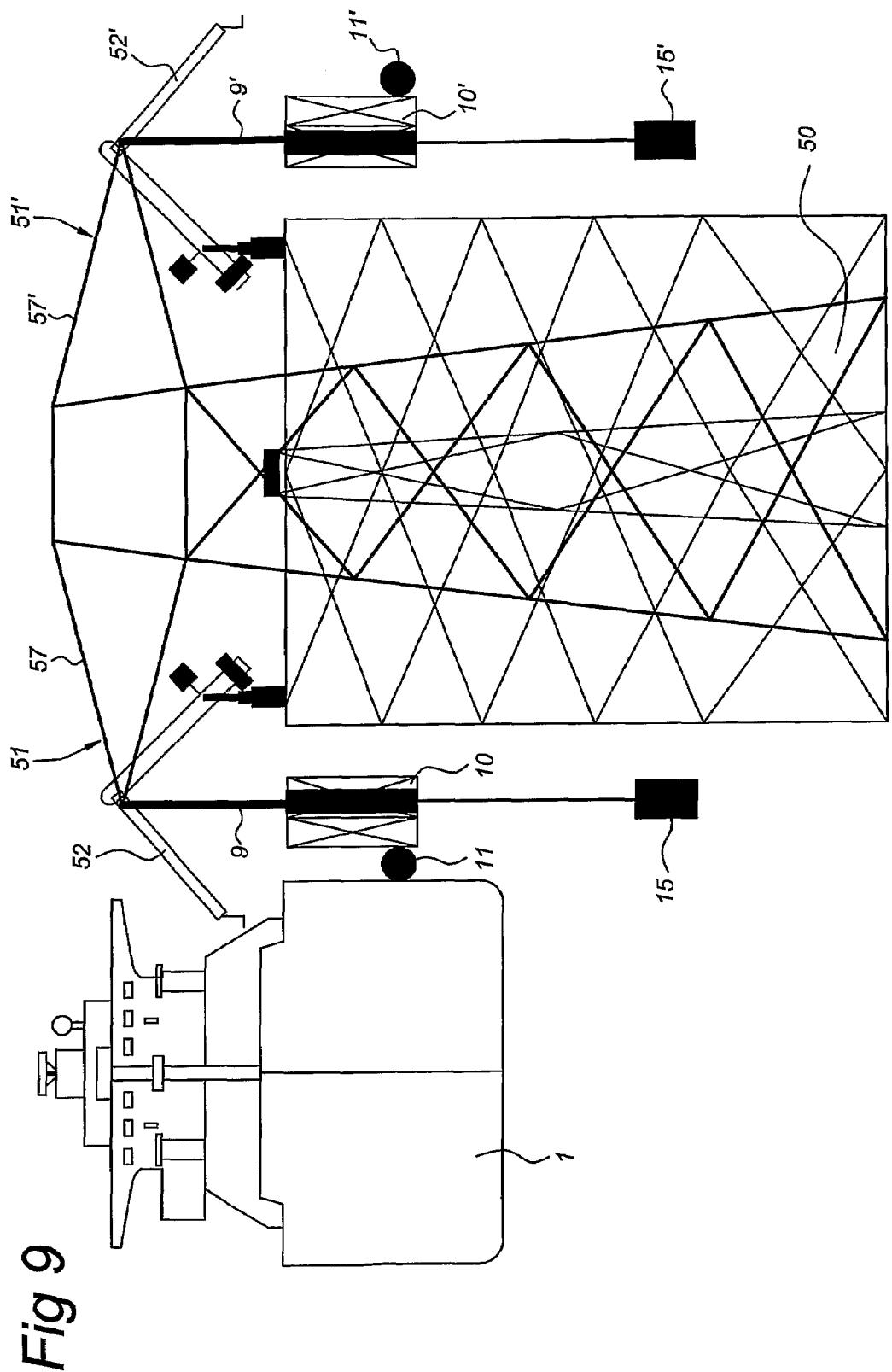
Figure 10:
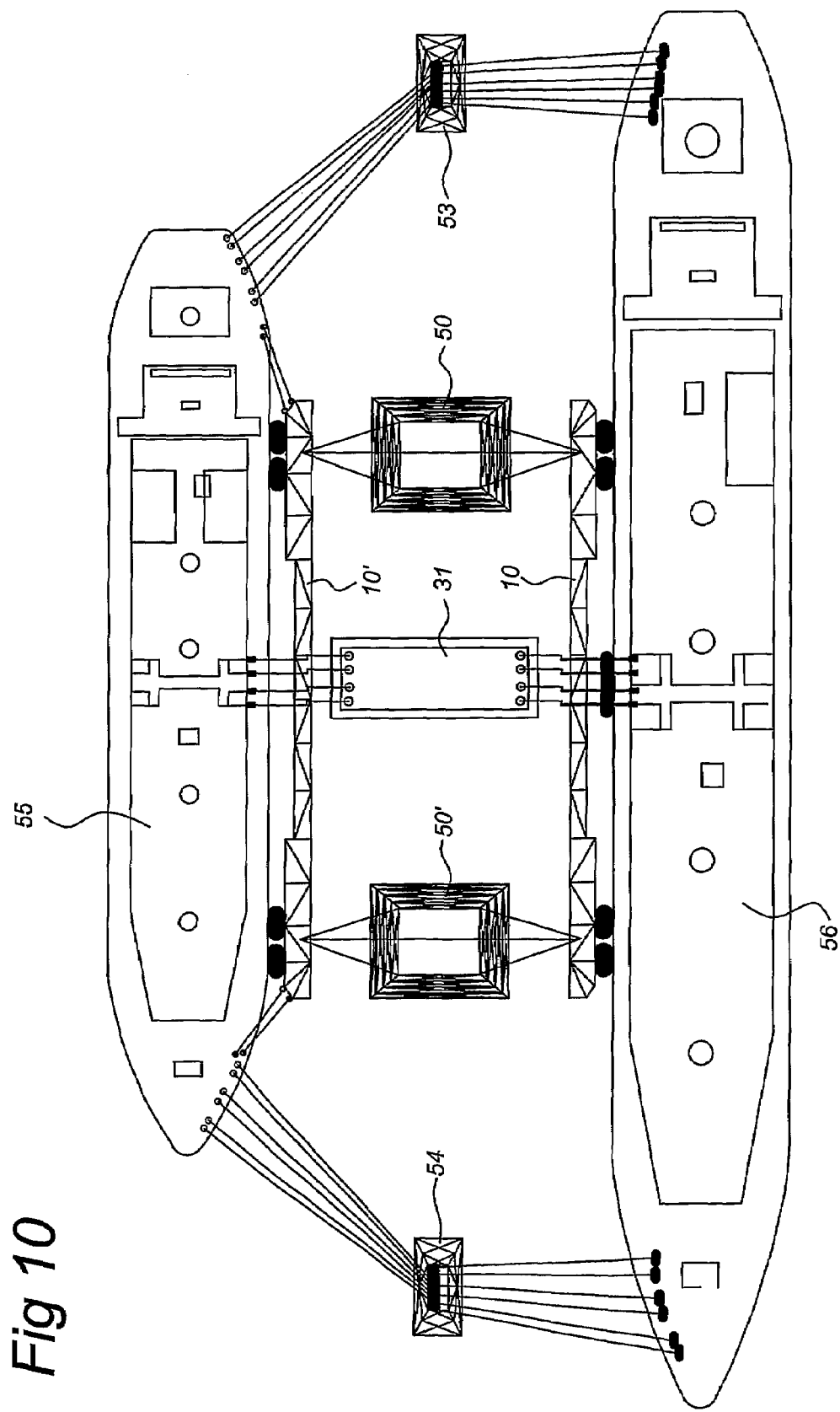
Figure 11:
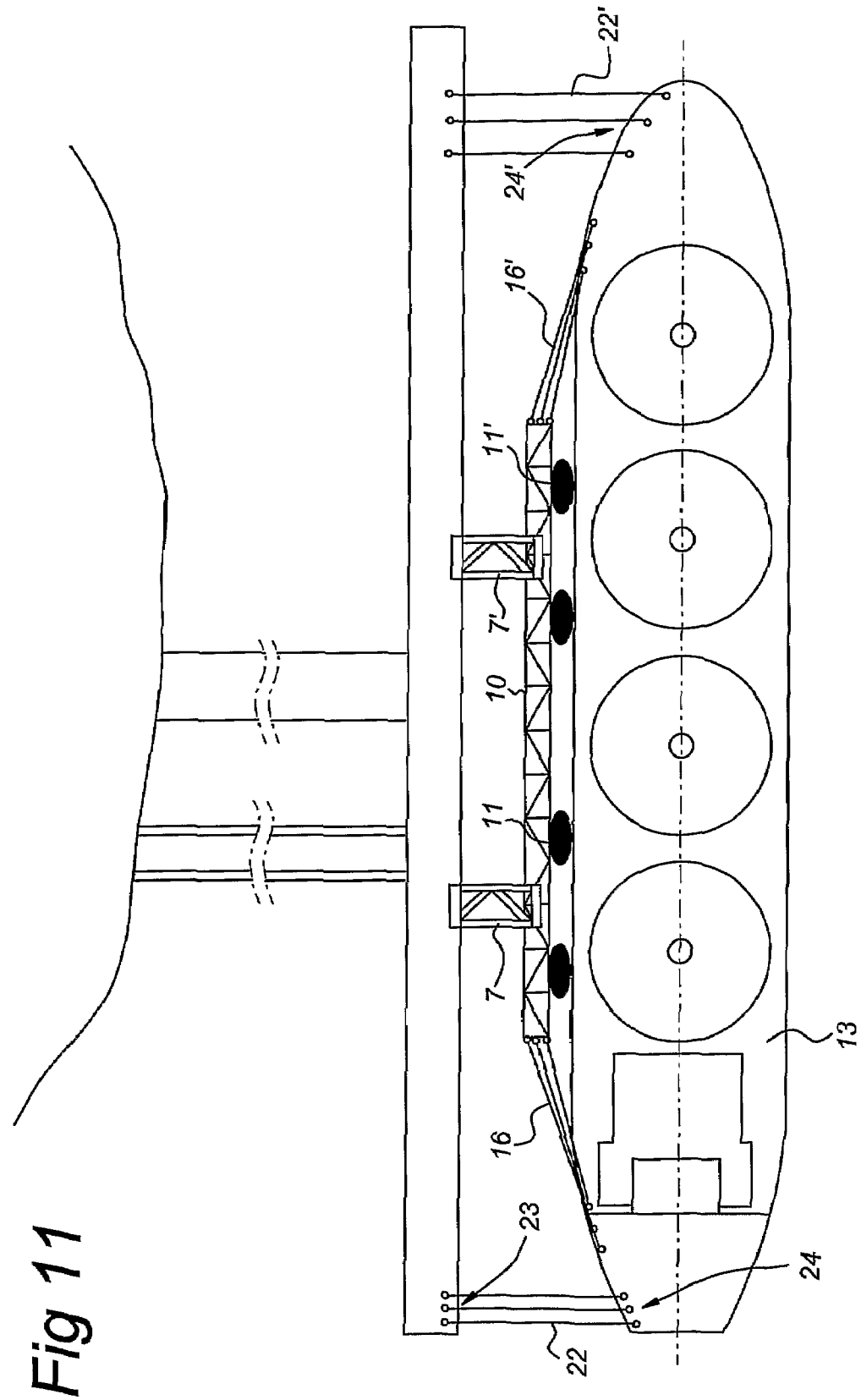

Some embodiments of a mooring system according to the present invention will, by way of example, be explained in detail with reference to the accompanying drawings. In the drawings:

FIGS. 1 and 2 show a schematic side view of a mooring system of the present invention with the quay member in an active position and in a storage position, respectively, FIGS. 3 and 4 show a schematic view of a mooring system wherein an alternative suspension member is shown which comprises a triangular frame, in a transverse side view and a longitudinal side view, respectively, FIG. 5 shows a top view of the mooring system of FIGS. 3 and 4, FIG. 6 shows a top view of a mooring system comprising mooring lines directly connecting respective front and rear sections of the unit and a moored vessel, FIG. 7 shows a top view of a mooring system in which the quay member is comprised of two separate parts, FIG. 8 shows a top view of a mooring system in which the quay member extends substantially along the whole length of the vessel, FIG. 9 shows a front view of an embodiment comprising a seabed-supported tower carrying a mooring system, FIG. 10 shows a plan view of a mooring structure to which two vessels are moored on each side of seabed-supported towers, and FIG. 11 shows a plan view of a mooring structure in which front and rear breast lines are located substantially perpendicular to the longitudinal direction.

FIG. 1 shows a storage and/or processing unit 1, which can be an single point or spread moored FPSO (floating production storage and offloading), a Gravity Based Structure (GBS) which rests on the seabed, an LNG FSRU (floating storage and regasification unit), etc. The unit 1 shown in FIG. 1 is moored to the seabed 2, for instance via a turret 3 and anchor lines 5. The unit 1 can weathervane around the turret 3 in response to wind and current directions. Alternatively, the unit 1 can be anchored to the seabed via a spread mooring in a fixed or in a semi-weathervaning manner.

Along a side of the hull 6, a support arm 7 projects outwardly from the hull, for instance by a distance of 25 m. Via a suspension member 9, which preferable is a chain or cable (but which also could be rods, a pivoting structure, combined cable-rod structures, etc.), quay 10 in the form of a space frame is suspended from the support arm 7. A shock absorber, such as an inflatable fender 11 is attached to the quay 10 and is situated between the quay 10 and the vessel 13, which can be a LNG shuttle carrier or a tanker which is moored alongside the unit 1 at a distance of between 10 and 50 m. The fender 11 comprises for instance a Yokohama floating fender of a length of 12 m and diameter of 4.5 m. Via a chain or cable 14 (which can be a continuation of cable 9), which may have a length of for instance 20 m, a tensioning weight 15 is suspended from the quay 10. Alternatively the weight 15 can be placed within the quay 10 or weight 15 or additional mass can be created with ballast tanks which are placed within the quay 10. The vessel 13 is moored to the quay 10 via mooring cables 16, which are connected to a mooring point 17 on the vessel 13, and to a mooring line attachment point 18 on the space frame 10. The mooring cables 16 firmly attach the vessel 13 to the quay 10, such that the fender 11 is compressed. The vessel 13 can drift with respect to the unit 1 in a sideways, transverse direction, for instance by 5 m around its equilibrium position, and in a length, or longitudinal direction, by the cable 9 being displaced out of its vertical plane. When the quay 10 is displaced by the moored vessel 13 in a transverse and/or longitudinal direction the tensioning weight 15 provides a restoring force which counteracts the drift of the quay 10 and moored vessel 13.

The weighted quay 10 can, after the vessel 13 is detached from the quay 10 and hauling in of the mooring line 16, be stored in a rest position and for example be deballasted, pulled on board or alongside the unit 1 for storage or maintenance purposes, via rotation or the support structure 7, hauling in of the cables 9 and/or hauling in of the quay 10, for instance via a winch 19 and attaching the quay 10 to the deck of the vessel in a parking attachment point 20. When the vessel 13 approaches the unit 1, the quay 10 is already placed outboard the unit 1 so it can function as buffer during the mooring procedure and collisions of the vessel 13 and the unit 1 are prevented.

In the alternative embodiment shown FIG. 3, the quay 10 is suspended from a cable 9 and a triangular yoke 12 which together form a suspension member. The legs 8, 8' of the yoke 12 are coupled to the space frame 10 via a hinging connection 21, 21'. The stiffness of the mooring system in the longitudinal direction is determined by the length of the cable 9 and the tension in the cable 9 created by the weight of the quay 10 and additional weights 15, the stiffness being at a maximum value when this length is zero and the yoke 12 is directly attached to the support arm 7. The stiffness in a sideway, transverse direction will be determined by the support height H of the yoke 12 and cable 9 in combination and the tension in the cable 9 created by the weight of the quay 10 and additional weights 15. In addition, multiple mooring lines 22 clan be added which extend transversely to the length directions of the unit 1, and vessel 13 between a mooring point 24 on the vessel 13 and a mooring point 23 on the unit 1, which help to limit the relative yaw and sway of the vessel 13 with regard to the unit 1. Pretensioning of the mooring lines 22 creates a continuous transverse outward restoring force acting on the vessel 1 via the quay 10, which will further help to limit and control the relative yaw and sway movements of the vessel 13.

To compensate for the weight of the mooring system consisting of the support structure 7, the suspension member 9, the quay 10 and weight 15, the hydrocarbon storage and/or processing unit 1 can be provided with ballast tanks 23 at the opposite side of the quay 10.

In FIG. 4 it is shown that the unit 1 is in a front part 26 and in a rear part 25 provided with respective support arms 7, 7' and triangular yokes 12, 12', carrying the space frame 10, which is partly situated below water level 27. Multiple support arms 7, 7' are also possible in the front part 26 and rear part 25, depending on the size and weight of quay 10.

In FIG. 5 it can be seen that the mooring points 17, 17' near the bow and the stern on the vessel 13 connected to breast lines 16, 16', lie at a distance L1 of between 10 and 75 m from the mooring line attachment points 18, 18' on the space frame 10. The mooring points 29, 29' on the vessel 13 of the spring lines 28, 28' lie at a distance L2 of between 10 and 100 m from the mooring line attachment points 18, 18' on the space frame 10. Although it is possible to more vessel 13 only with breast lines 16, 16' or only with spring lines 28, 28' to quay 10, it is preferred to employ both breast and spring lines 16, 16', resp. 28, 28'. In this manner the vessel 13 is attached to the quay 10, the stiffness being determined by the length and the material of the breast lines 16, 16' and spring lines 28, 28'. Multiple mooring lines 22, 22' extend transversely to the length directions of the unit 1, and vessel 13 between mooring points 24, 24' on the vessel 13 and corresponding mooring point 23, 23' on the unit 1, which help to limit the relative yaw and sway of the vessel 13 with regard to the unit 1. Pretensioning of the mooring lines 22, 22' creates a continuous transverse outward restoring force acting on the vessel 1 via the quay 10, which will further help to limit and control the relative yaw and sway movements of the vessel 1.

A fluid transfer system 31 extends between tanks on the vessel 13 to product piping on the storage and/or processing unit 1. Fluid transfer connections can be made with loadings arms or hoses which are bridging the distance between vessel 13 and unit 1 or which are (partly) supported by the quay 10.

FIG. 6 shows an embodiment in which vessel 13 is a LNG shuttle tanker or carrier which is moored to unit 1 which is a FSRU via breast lines 16, 16' attached to quay 10 and via transverse mooring lines 22, 22' which extend from multiple attachment points 24, 24' on the vessel 13 to multiple attachment points 23, 23' on the unit 1.

In the embodiment of FIG. 7, two quay members 10, 10' are provided, each connected to the vessel 13 via mooring lines 16, 30; 16', 30'. Vessel 13 is also direct attached to the unit 1 via multiple mooring lines 22, 22' at the bow and the stern of the vessel 13. The arms 7, 7' provide spaced-apart support positions along each quay 10, 10'.

FIG. 8 shows a single quay 10 attached to the vessel 13 via breast lines 16, 31; 16', 31'.

FIG. 9 shows a vessel 1 moored to a quay 10 suspended from a tower 50. The tower 50 may be supported on the sea bed, on a jetty or on shore. In the preferred embodiment that is shown, the tower 50 rests on the sea bed and comprises on each side 51, 51' a mooring quay 10, 10', a fender 11, 11' and hydrocarbon transfer aim 52, 52'.

In the embodiment of FIG. 10, two towers 50, 50' are provided, on each side of which a vessel 55, 56 is moored. Front and rear breast lines are attached to separate mooring structures 53, 54. In this manner, continuous offloading can occur if the offloading of the vessels 55, 56 is carried out in a sequential manner.

In the embodiment of FIG. 11, the front and rear breast lines extend substantially perpendicular to the longitudinal direction, such that a stable mooring is achieved.

LNG carriers can be moored the soft quay 10 according to the invention, and LNG can be directly offloaded to or loaded from shore, via cryogenic pipelines. Each tower 50, 50' can be provided with processing units, such as regasification units. Alternatively, the towers do not have LNG processing equipment and can be connected to on shore or offshore LNG storage tanks, or other LNG processing facilities.

The soft quay 10 can also be mounted on a tower 50, 50' which is supported on a conventional LNG transfer jetty, or can be mounted on shore on for instance a quay side.

The invention claimed is:

1. Mooring system comprising a hydrocarbon storage and/or processing (1) unit anchored to or resting on the sea bed (2) at an off shore location, and a vessel (13) moored alongside the storage and/or processing unit (1), the storage and/or processing unit (1) comprising a hull (6) and in a front part (26) and in a rear part (25) of the unit at least one support structure (7, 7') along a side of the unit, projecting outboard from the hull (6), a suspension member (9, 12) with one end attached to the support structure (7, 7') and with another end to a quay member (10, 10') suspended from the suspension member, the quay member comprising a shock-absorber (11, 11') contacting the vessel (13), characterised by the quay member (10, 10') comprising a mooring line attachment point (18, 18'), a cable (16, 16', 28, 28') extending from a mooring point (17, 17', 29, 29') on the front part (26) of the vessel (13) and on the rear part (25) of the vessel (13) respectively to a corresponding mooring line attachment point (18, 18') on the quay member (10, 10'), the mooring points (17, 17', 29, 29') on the vessel and the corresponding mooring line attachment points (18, 18') being spaced apart in a length direction of the vessel (13) by a distance (L1, 01) of at least 5 m, and wherein the suspension member comprises a triangular frame (12, 12') comprising two legs (8, 8') hingingly attached to the quay member (10, 10') and having a top attached to a cable (9) or chain which is attached to the support structure (7, 7').

2. Mooring system according to claim 1, wherein in the front part (26) and rear part (25) of the storage and/or processing unit (1) a respective support structure (7, 7') and a quay member (10, 10') are provided.

3. Mooring system according to claim 1, wherein in the front part (26) and in the rear part (25) of the storage and/or processing unit (1) at least one support structure (7, 7') is provided, a single quay member (10) being suspended from the support structures (7, 7') having a length at least substantially corresponding to a distance between the support structures (7, 7').

4. Mooring system according to claim 1, wherein the vessel (13) at the bow and the stern is attached to the storage and/or processing unit (1) via respective mooring lines (22, 22').

5. Mooring system according to claim 4, wherein the mooring lines (22, 22') at the bow and at the stern of vessel (13) are pre-tensioned.

6. Mooring system according to claim 5, wherein the mooring lines (22, 22') at the bow and at the stern are attached to a constant tension device.

7. Mooring system according to claim 1, wherein the quay member (10, 10') comprises a space frame, partially submerged below water level.

8. Mooring system according to claim 1, wherein the storage and/or processing unit (1) comprises a lifting device (19) for raising and lowering of the quay member (10), and an attachment device (28) for attaching the quay member (10) in a raised position near or against the side of the unit (1).

9. Mooring system according to claim 1, wherein the quay member (10, 10') has a height above water level of between 5 and 25 m, a width between 2 and 10 m, and a length between 5 and 50 m.

10. Mooring system according to claim 1, wherein the quay member (10, 10') is provided with ballast tanks.

11. Mooring system according to claim 1, wherein the hydrocarbon storage and/or processing unit (1) is provided with at least one ballast tank (23) at the opposite side of quay member (10, 10') for compensation of the weight of the support structure (7, 7'), quay member (10, 10') and/or weight (15).

12. Mooring system according to claim 1, wherein the hydrocarbon storage and/or processing unit (1) is moored to a single point mooring system.

13. Mooring system according to claim 12, wherein the hydrocarbon storage and/or processing unit (1) is moored to the seabed via turret (3) and anchorlines (5).

14. Mooring system comprising a hydrocarbon storage and/or processing (1) unit anchored to or resting on the sea bed (2) at an offshore location, and a vessel (13) moored alongside the storage and/or processing unit (1), the storage and/or processing unit (1) comprising a hull (6) and in a front part (26) and in a rear part (25) of the unit at least one support structure (7, 7') along a side of the unit, projecting outboard from the hull (6), a suspension member (9, 12) with one end attached to the support structure (7, 7') and with another end to a quay member (10, 10') suspended from the suspension member, the quay member (10, 10') comprising a shock-absorber (11, 11') contacting the vessel (13), characterised by the quay member (10, 10') comprises a mooring line attachment point (18, 18'), a cable (16, 16', 28, 28') extending from a mooring point (17, 17', 29, 29') on the front part (26) of the vessel (13) and on the rear part (25) of the vessel (13) respectively to a corresponding mooring line attachment point 18, 18' on the quay (10, 10'), the vessel (13) at the bow and the stern directly attached to the unit (1) via multiple mooring lines (22, 22'), and wherein the suspension member comprises a triangular frame (12, 12') comprising two legs (8, 8') hingingly attached to the quay member (10, 10') and having a top attached to a cable (9) or chain which is attached to the support structure (7, 7').

15. Mooring system according to claim 14, wherein in the front part (26) and rear part (25) of the storage and/or processing unit (1) a respective support structure (7, 7') and a quay member (10, 10') are provided.

16. Mooring system according to claim 14, wherein the quay member 10 supports a fluid transfer system for transfer of hydrocarbons between the vessel (13) and unit (1).

17. Method of designing and constructing a mooring system by providing in a computer device a representation of relative size of components of the mooring system, the materials thereof and forces acting thereon, the mooring system comprising a hydrocarbon storage and/or processing unit (1) anchored to or resting on the sea bed (2) at an offshore location, and a vessel (13) moored alongside the storage and/or processing unit (1), the storage and/or processing unit (1) comprising a hull (6) and in a front part (26) and in a rear part (25) of the vessel at least one support structure (7, 7')

along a side of the vessel, projecting outboard from the hull (6), a suspension member (9, 12) with ore end attached to the support structure (7, 7') and with another end to a quay member (10, 10') suspended from the suspension member, the quay member comprising a shock-absorber (11, 11') contacting the vessel (13), characterised by the quay (10, 10') comprising a mooring line attachment point (18, 18'), a cable (16, 16', 28, 28') extending from a mooring point (17, 17', 29, 29') on the front part (26) of the tanker and on the rear part (25) of the vessel (13) respectively to a corresponding mooring line attachment point (18, 18') on the quay member (10, 10'), the mooring points (17, 17', 29, 29') on the vessel (13) and the corresponding mooring line attachment points (18,18') being spaced apart in a length direction of the vessel (13) by a distance (L1, L2) of at least 5 m, and wherein the suspension member comprises a triangular frame (12, 12') comprising two legs (8, 8') hingingly attached to the quay member (10, 10') and having a top attached to a cable (9) or chain which is attached to the support structure (7, 7'), and constructing a mooring system according to an output of said computer device.

18. Mooring system comprising a tower (50, 50') and a vessel (13) moored alongside the tower, the tower (50, 50') comprising support structure (57, 57') a suspension member (9, 12) with one end attached to the support structure (7, 7') and with another end to a quay member (10, 10') suspended from the suspension member, the quay member comprising a shock-absorber (11, 11') contacting the vessel (13), and wherein the suspension member comprises a triangular frame (12, 12') comprising two legs (8, 8') hingingly attached to the quay member (10, 10') and having a top attached to a cable (9) or chain which is attached to the support structure (7, 7').

19. Mooring system according to claim 18, characterised by the quay member (10, 10') comprising a mooring line attachment point (18, 18'), a cable (16, 16', 28, 28') extending from a mooring point (17, 17', 29, 29') on the front part (26) of the vessel (13) and on the rear part (25) of the vessel (13) respectively to a corresponding mooring line attachment point (18, 18') on the quay member (10, 10'), the mooring points (17, 17', 29, 29') on the vessel and the corresponding mooring line attachment points (18, 18') being spaced apart in a length direction of the vessel (13) by a distance (L1, L2) of at least 5 m.

20. Mooring system comprising a quay, jetty, a vessel or a tower and a vessel moored alongside the quay, jetty, vessel or tower, which comprises a support structure, a suspension member with one end attached to the support structure and with another end to a quay member suspended from the suspension member, the quay member comprising a shock-absorber contacting the vessel, wherein the vessel comprises rear and front anchor lines which extend, substantially perpendicular from the vessel to the quay member, and wherein the suspension member comprises a triangular frame (12, 12') comprising two legs (8, 8') hingingly attached to the quay member (10, 10') and having a top attached to a cable (9) or chain which is attached to the support structure (7, 7').

\* \* \* \* \*